March 29, 1960 L. J. SIRI 2,930,876
CONTROL MOUNTING ASSEMBLY
Filed Jan. 30, 1959 2 Sheets-Sheet 1
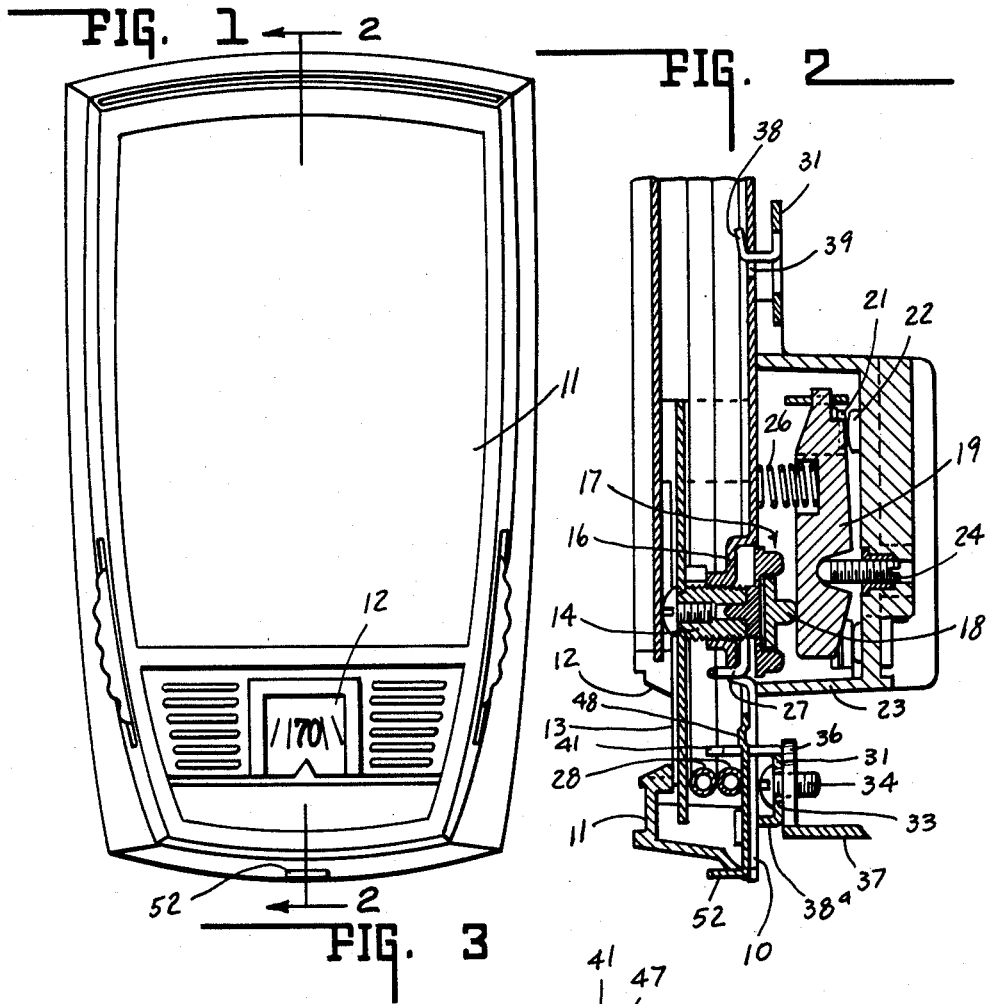
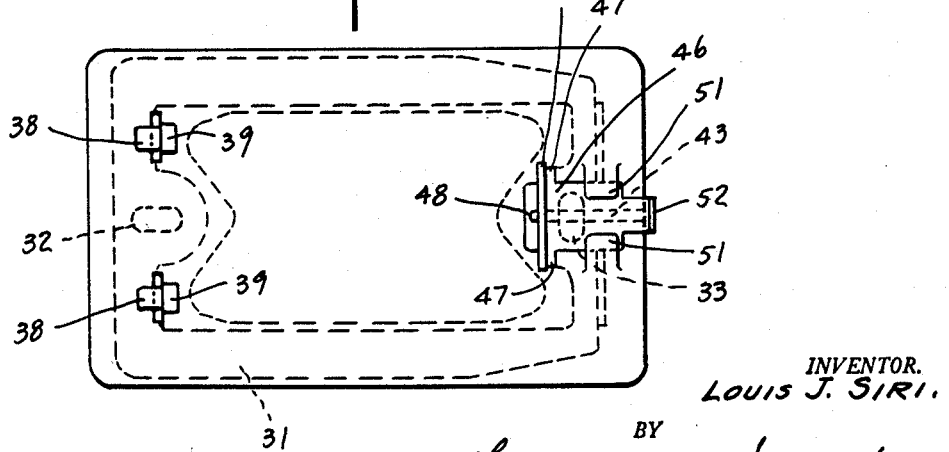
INVENTOR.
LOUIS J. SIRI,
BY
Lockwood, Woodard, Smith & Weikart.
ATTORNEYS.

March 29, 1960 L. J. SIRI 2,930,876
CONTROL MOUNTING ASSEMBLY
Filed Jan. 30, 1959 2 Sheets-Sheet 2
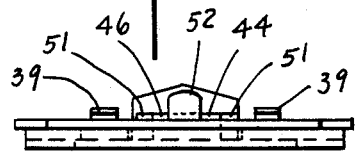
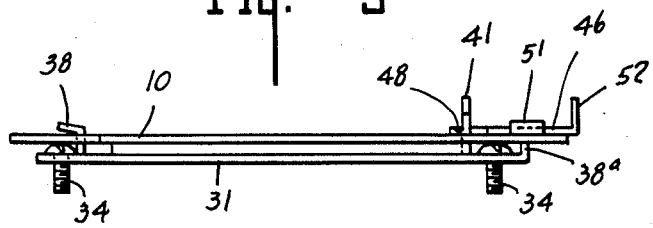
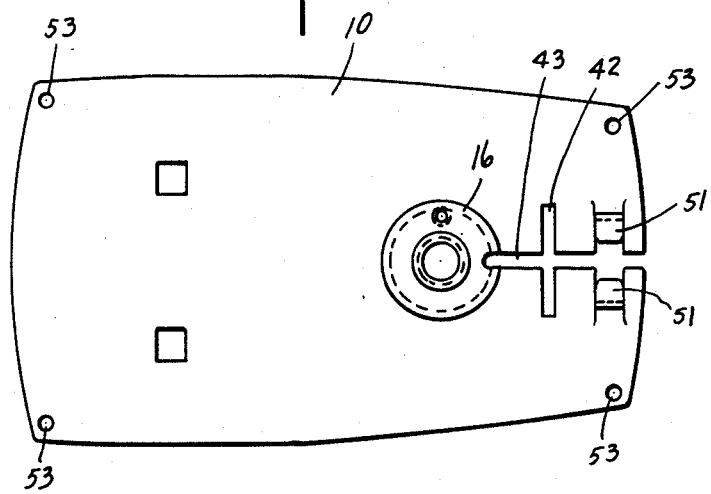
INVENTOR.
LOUIS J. SIRI.
BY
Lockwood, Woodard, Smith & Weikart,
ATTORNEYS.

United States Patent Office 2,930,876
Patented Mar. 29, 1960

2,930,876

CONTROL MOUNTING ASSEMBLY

Louis J. Siri, South Bend, Ind., assignor to Penn Controls, Inc., Goshen, Ind., a corporation Application January 30, 1959, Serial No. 790,219

4 Claims. (Cl. 200—168)

This invention relates generally to a mounting means for wall or panel mounted controls and particularly to control mounting assembly for detachably locking a room thermostat in proper position on a wall or other supporting surface.

Conventional thermostats include a base mounting the temperature responsive element and contacts, the base being mounted in overlying relation to a wall-supported bracket by means of screws which extend through the base and are threaded into the bracket. The thermostat cover, when in place, covers the base so that to install or remove the thermostat from its supporting bracket, the cover must be removed and a screwdriver then inserted into the mounting screws.

Electric heating thermostats often utilize a liquid expansion diaphragm for operating the thermostat contacts, the diaphragm having associated therewith a coiled bulb or tube which receives heat to cause operation of the diaphragm. It is undesirable to mount such thermostats by the conventional means mentioned above for the reason that in removing the thermostat cover and inserting a screwdriver for tightening or loosening the mounting screws, the coiled bulb might quite easily be bent or deformed thereby destroying the calibration of the device. The most desirable arrangement with this type of thermostat is to permanently fix the cover to the thermostat base by staking or similar means thereby eliminating the danger of damaging the components by anyone installing or removing the control from its mounting. Staking the thermostat cover to its base, however, while safeguarding the thermostat components, presents obvious difficulties in providing a mounting and terminal connections.

The present invention meets this difficulty by providing a wall plate or frame which may be separately mounted on a conduit box or similar wall mounting means. The mounting plate includes hangers which are received in apertures in the thermostat base and a snap lock (accessible but inconspicuous from the exterior of the thermostat cover) carried by the thermostat base which detachably locks the thermostat to the wall plate. With the wall plate installed, wiring to the back of the thermostat base may be completed and the thermostat may be locked to the wall plate without requiring removal of the thermostat cover.

The primary object of the present invention is thus to provide a control mounting assembly which reduces installation time and prevents damage to the interior components of the control.

The full nature of the invention will be understood from the accompanying drawings and the following description and claims:

Fig. 1 is a top plan view of a thermostat embodying the present invention.

Fig. 2 is a fragmentary sectional view taken generally along the line 2—2 of Fig. 1.

Fig. 3 is a top plan view of the thermostat base plate shown locked to the underlying wall plate.

Fig. 4 is an end view of the structure shown in Fig. 3.

Fig. 5 is a side view of the structure shown in Fig. 3.

Fig. 6 is a top plan view of the thermostat base plate.

Referring initially to Figs. 1 and 2, there is shown an electric heating thermostat including a base plate 10 which supports the thermostat components, the outer face of the base plate being enclosed by a thermostat cover 11. The thermostat cover is apertured at 12 to provide visual access to a dial plate 13 locked for rotation with a hub 14. The hub is threaded into an aperture formed by frontwardly struck portions 16 of the base plate. The hub supports a liquid expansion type power element indicated generally at 17, the power element having a thrust member 18 which bears against a switching lever 19. The switching lever is adapted to move a normally open contact 21 with relation to a fixed contact 22, the lever 19 and accompanying switch structure being housed in a casing 23 mounted on and extending rearwardly from the base plate 10.

The switching lever 19 is calibrated by means of a screw 24, accessible from the rear face of the casing 23 and a compression spring 26 causes the lever 19 to follow the thrust member 18. The interior of the diaphragm-type power element 17 is connected by means of a capillary tube 27 to a coiled bulb or enlarged tube 28. The bulb, capillary tube and diaphragm are filled with a fluid having an appreciable thermal coefficient of expansion whereby movement of the thrust member 18 is a direct function of the temperature of the fluid in the coiled bulb 28. The structure so far mentioned forms no part of the present invention and has therefore not been described in complete detail.

The present invention provides a means for locking the thermostat base plate 10 to a wall plate or frame 31. Referring to Figs. 3–6, it may be seen that the wall plate 31 is provided with apertures 32 and 33 which accommodate mounting screws 34 (Fig. 5) which are adapted to be threaded into the conventional tabs 36 formed on a conduit box 37, one of the tabs 36 and a portion of the conduit box being shown in Fig. 2.

Adjacent its upper end, the wall plate 31 has upturned tabs 38 extending outwardly from the plate and received by apertures 39 in the thermostat base plate 10. The lower margin of the wall plate is flanged outwardly at 38a to space the lower portion of the thermostat base plate therefrom. Adjacent its lower end, the wall plate carries an outwardly extending tab 41, the tab 41 extending freely through the transverse portion 42 of a cross-shaped slot 43 formed in the base plate. As may best be seen in Fig. 4, the tab 41 is provided with a slot 44 which receives one end portion of a locking member 46. The locking member has sidewardly extending portions 47 which limit its movement into the slot in the tab 41 and is further provided with an abutment 48 which cooperates with the tab to detent the locking member in the position shown in Figs. 3–5. The locking member slides over the front face of the base plate 10 and is retained thereon by means of opposed, spaced members 51 struck outwardly from the plane of the base plate and formed to overlie the shank portion of the locking member. The lower end of the locking member extends slightly beyond the margin of the base plate and is bent outwardly to form a tab 52 which, as may be seen in Figs. 1 and 2 is accessible from the front of the thermostat for sliding the locking member out of the slotted tab 41.

In assembling the thermostat the cover 11 is permanently fixed to the base plate 10 by staking through the apertures 53 formed in the base plate (Fig. 6). The thermostat may be installed by mounting the wall plate or frame 31 upon a properly located conduit box by means of screws 34. The necessary terminal wiring may then be made to the casing 23. Thereafter the base plate may be hung upon the tabs 38 extending from the wall plate, and the lower portion of the base plate may be positioned so that the tab 41 extends therethrough. By means of the tab 52 the locking member 46 may then be moved upwardly to its position shown in the drawings whereby it will extend through the slot 44 in the tab 41 thereby locking the lower portion of the base plate to the wall plate.

If the thermostat must be removed for recalibration or replacement it is only necessary to move the tab 52 downwardly, thereby withdrawing the locking member 46 from the tab 41, and subsequently unhook the upper portion of the base plate from the tabs 39. It should be noted that the mounting or demounting of the thermostat may thus be accomplished without removing the thermostat cover 11 from the base plate. The arrangement permits a shorter installation time than is the case with conventional thermostat mounting arrangements and further prevents damage to thermostat components which might occur upon removal of the cover from the base plate.

While the invention has been disclosed and described in some detail in the drawings and foregoing description, they are to be considered as illustrative and not restricted in character, as other modifications may readily suggest themselves to persons skilled in this art and within the broad scope of the invention, reference being had to the appended claims.

The invention claimed is:

1. Detachable mounting means for a thermostat including a base plate supporting a temperature responsive switch structure and having its front face enclosed by a cover, a wall plate adapted to be rigidly supported on a wall or the like, spaced L-shaped tabs extending from the upper portion of said wall plate and received within apertures formed in said base plate whereby said base plate may be hung from said wall plate, means for removably locking the lower portion of said base plate to said wall plate including a slotted tab carried by said wall plate and extensible freely through an aperture in said base plate, a locking member supported for sliding movement across the front face of said base plate and moveable into a locking position wherein said locking member extends through the tab aperture, an abutment carried by said locking member and cooperating with said slotted tab to detent said member in locking position, a portion of said locking member extending exteriorly of said cover for manual removal of said member from locking position, whereby said base plate may be attached and detached to said wall plate without requiring removal of the thermostat cover from said base plate.

2. Detachable mounting means for a thermostat including a base plate supporting a temperature responsive switch structure and having its front face enclosed by a cover, a wall plate adapted to be rigidly supported on a wall or the like, spaced L-shaped tabs extending from the upper portion of said wall plate and received within apertures formed in said base plate whereby said base plate may be hung from said wall plate, means for removably locking the lower portion of said base plate to said wall plate including a slotted tab carried by said wall plate and extensible freely through an aperture in said base plate, a locking member supported for sliding movement across the front face of said base plate and moveable into a locking position wherein said locking member extends through the tab aperture, a portion of said locking member extending exteriorly of said cover for manual removal of said member from locking position, whereby said base plate may be attached and detached to said wall plate without requiring removal of the thermostat cover from said base plate.

3. Detachable mounting means for a thermostat including a base plate supporting a temperature responsive switch structure and having its front face enclosed by a cover, a wall plate adapted to be rigidly supported on a wall or the like, means for hanging said base plate upon said wall plate, means for removably locking the lower portion of said base plate to said wall plate including a slotted tab carried by said wall plate and extensible freely through an aperture in said base plate, a locking member supported for sliding movement across the front face of said base plate and moveable into a locking position wherein said locking member extends through the tab aperture, an abutment carried by said locking member and cooperating with said slotted tab to detent said member in locking position, a portion of said locking member extending exteriorly of said cover for manual removal of said member from locking position, whereby said base plate may be attached and detached to said wall plate without requiring removal of the thermostat cover from said base plate.

4. Detachable mounting means for a thermostat including a base plate supporting a temperature responsive switch structure and having its front face enclosed by a cover, a wall plate adapted to be rigidly supported on a wall or the like, means for hanging said base plate upon said wall plate, means for removably locking said base plate to said wall plate including a member carried by said wall plate and extensible freely through an aperture in said base plate, a locking member supported for sliding movement across the front face of said base plate and moveable into cooperating relation with said base plate member to define a locking position, a portion of said locking member extending exteriorly of said cover for manual removal of said member from locking position, whereby said base plate may be attached and detached to said wall plate without requiring removal of the thermostat cover from said base plate.

References Cited in the file of this patent
UNITED STATES PATENTS

| | | |
|---|---|---|
| 1,544,604 | Scott | July 7, 1925 |
| 1,545,614 | Scott | July 14, 1925 |
| 1,610,479 | Scott | Dec. 14, 1926 |
| 2,888,537 | Mears | May 26, 1959 |